(12) United States Patent
Madera et al.

(10) Patent No.: US 11,191,305 B2
(45) Date of Patent: Dec. 7, 2021

(54) MANUFACTURING MACHINE FOR THE PRODUCTION OF DISPOSABLE CARTRIDGES FOR ELECTRONIC CIGARETTES

(71) Applicant: G.D SOCIETA' PER AZIONI, Bologna (IT)

(72) Inventors: Giovanni Madera, Bologna (IT); Carlo Moretti, Bologna (IT); Luca Lanzarini, Crespellano (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 270 days.

(21) Appl. No.: 16/344,043

(22) PCT Filed: Oct. 26, 2017

(86) PCT No.: PCT/IB2017/056660
§ 371 (c)(1),
(2) Date: Apr. 23, 2019

(87) PCT Pub. No.: WO2018/078565
PCT Pub. Date: May 3, 2018

(65) Prior Publication Data
US 2019/0246697 A1 Aug. 15, 2019

(30) Foreign Application Priority Data
Oct. 26, 2016 (IT) .................. 102016000108303

(51) Int. Cl.
*A24F 40/70* (2020.01)
*A24F 40/10* (2020.01)
(Continued)

(52) U.S. Cl.
CPC ............. *A24F 40/70* (2020.01); *A24F 40/10* (2020.01); *A24F 40/42* (2020.01); *B23P 19/04* (2013.01); *B23P 21/004* (2013.01)

(58) Field of Classification Search
CPC . A24C 5/01; A24F 40/00; A24F 40/70; A24F 40/80; A24F 40/10;
(Continued)

(56) References Cited
U.S. PATENT DOCUMENTS

2001/0054536 A1 12/2001 Spatafora
2014/0261408 A1* 9/2014 DePiano .................. H05B 3/04
128/202.21
(Continued)

FOREIGN PATENT DOCUMENTS

DE 102015103833 B3 2/2016
EP 3025600 A1 6/2016
(Continued)

OTHER PUBLICATIONS

Translation of DE102015103833 (Year: 2016).*
(Continued)

*Primary Examiner* — Matthew P Travers
(74) *Attorney, Agent, or Firm* — Marshall, Gerstein & Borun LLP

(57) ABSTRACT

A manufacturing machine for the production of disposable cartridges for electronic cigarettes provided with a base; a support body, coupled to the base and is provided with a number of electrodes; a heating member electrically connected to the electrodes; and a substrate which surrounds the heating member. The manufacturing machine is provided with feeding conveyor, which feeds a semi-finished disposable cartridges along a forming path; and a number of operating stations arranged along the first forming path to alternatively carry out the supplying of a corresponding (Continued)

component of the semi-finished disposable cartridges or to carry out a processing of the components of the semi-finished disposable cartridges. The feeding conveyor has an annular guide arranged in a fixed position along the forming path; and a number of slides, each of which is coupled to a respective carriage designed to house the semi-finished disposable cartridges.

26 Claims, 11 Drawing Sheets

(51) Int. Cl.
*A24F 40/42* (2020.01)
*B23P 21/00* (2006.01)
*B23P 19/04* (2006.01)

(58) Field of Classification Search
CPC .......... A24F 40/40–465; A24F 47/008; A61M 11/042; A61M 15/06; A61M 2207/00; A61M 2207/10; B23P 19/001–002; B23P 19/007; B23P 19/04; B23P 21/004–006; Y10T 29/49764; Y10T 29/49829; Y10T 29/53365; Y10T 29/5337; Y10T 29/534; Y10T 29/53435; Y10T 29/53548
See application file for complete search history.

(56) References Cited

U.S. PATENT DOCUMENTS

| | | | |
|---|---|---|---|
| 2016/0144458 A1* | 5/2016 | Boldrini | A24F 40/70 228/176 |
| 2016/0338408 A1* | 11/2016 | Guenther, Jr. | B23P 19/10 |
| 2017/0311644 A1* | 11/2017 | Collett | A61M 15/06 |

FOREIGN PATENT DOCUMENTS

| | | |
|---|---|---|
| JP | H05051087 A | 3/1993 |
| JP | H11-114782 A | 4/1999 |
| JP | 2016-511008 A | 4/2016 |
| WO | WO-2014/058678 A1 | 4/2014 |
| WO | WO-2014/088889 A1 | 6/2014 |
| WO | WO-2014/150979 A2 | 9/2014 |
| WO | WO-2015/123558 A2 | 8/2015 |
| WO | WO-2015/140768 A2 | 9/2015 |
| WO | WO-2016/162850 A1 | 10/2016 |

OTHER PUBLICATIONS

International Application No. PCT/IB2017/056660, International Search Report and Written Opinion, dated Jan. 3, 2018.
European Patent Application No. 17801116.9, Communication Pursuant to Rule 114(2) EPC, dated Nov. 8, 2019.
Office Action, Japanese Patent Application No. 2019-522648, dated Aug. 3, 2021.

* cited by examiner

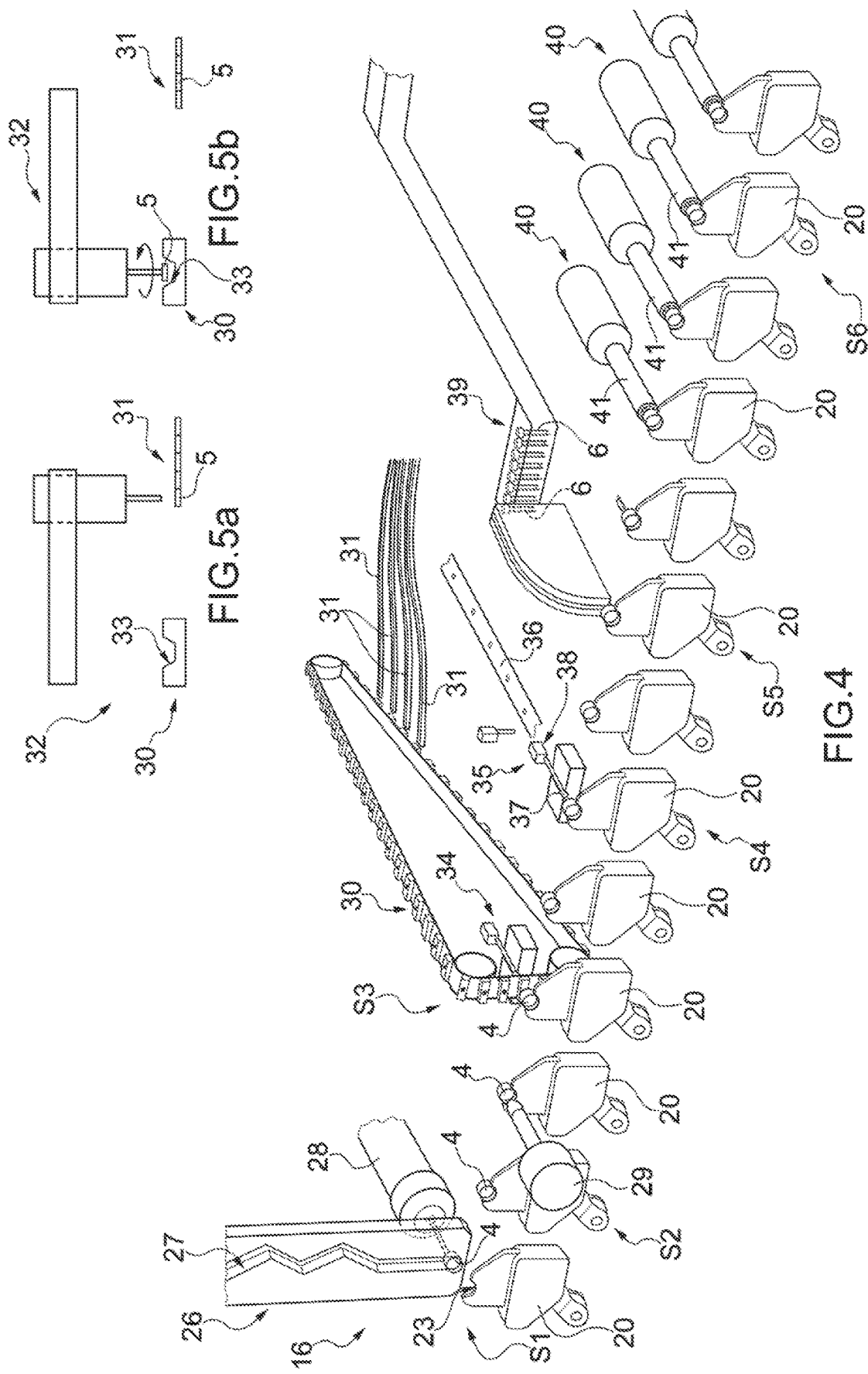

MANUFACTURING MACHINE FOR THE PRODUCTION OF DISPOSABLE CARTRIDGES FOR ELECTRONIC CIGARETTES

CROSS-REFERENCE TO RELATED APPLICATIONS

This is U.S. national phase of International Application No. PCT/IB2017/056660, filed Oct. 27, 2017, which claims the benefit of Italian Application No. 102016000108303, filed Oct. 26, 2016.

TECHNICAL FIELD

The present invention relates to a manufacturing machine for the production of disposable cartridges for electronic cigarettes.

PRIOR ART

Recently, an electronic cigarette has been proposed (described, for example, in patent applications WO2014058678A1 and WO2014088889A1) comprising a reusable cylindrical portion which is used several times and contains, amongst other things, an electric battery (which provides the necessary power for the functioning of the electronic cigarette). In addition, the electronic cigarette comprises a disposable and cylindrical-shaped cartridge (i.e. a single use cartridge, which, therefore, is used only once and is then replaced) that is screwed to the reusable part.

Each disposable cartridge comprises a cylindrical case which is internally hollow and an upper end thereof coupled to an upper cap whereas the lower end is coupled to a support base, which is made of a plastic material (electrically insulating) and which houses, on the inside, an electronic circuit that is electrically connected to two electrical connection terminals. The disposable cartridge also comprises a flow tube made of a plastic material (electrically insulating) and provided with a support body comprising a base which, in use, is coupled by means of welding to the support base and to a central channel acting as a support and, at the same time, as an insulating spacer so as to keep two electrodes suited to be connected to the electrical connection terminals well separated, from one another. The two electrodes are also electrically connected to a heating member, which comprises a wick made of an electrically insulating material bent in a "U" shape and a thermistor consisting of a wire spirally wound around at least the centre side of the U-shaped wick; at the two opposite ends of the wire two terminals are obtained, which are electrically connected to the corresponding electrodes by means of welding.

The disposable cartridge furthermore comprises, a substrate (such as a cotton pad) that is impregnated with a viscous liquid substance containing nicotine and possible flavours. The substrate has a cylindrical tubular shape and is arranged around the thermistor of the heating member so that, in use, the heat generated by the heating member warms the substrate causing a slow volatilization of the viscous liquid substance impregnating the substrate.

At present, the disposable cartridges are mostly made manually or with rudimentary manufacturing machines, which involve the continuous use of manpower; consequently, the production of disposable cartridges takes place in a slow manner (i.e. with a low productivity) and with a very variable (but generally modest) quality and has some drawbacks.

For example, the electrical connection terminals are picked up from corresponding containers where they are arranged in a bulk and are fed to corresponding movable coupling members which, by means of an axial movement, insert the electrical connection terminal into the corresponding support base; this step is achieved by applying a certain force required to obtain an interference fitting of the electrical connection terminal into the corresponding support base.

In addition, the tubular substrate is cut from a continuous belt wound in a spool and fitted around the two electrodes; in particular, the tubular substrate is elastically deformed (enlarged) so as to assume a larger dimension with respect to the size of the two electrodes, it is then fitted around the two electrodes and is finally released so that its natural elastic return makes it adhere to the two electrodes.

After placing the tubular substrate around the two electrodes, it is necessary to fit with force (so as to achieve a light mechanical interference coupling) the load-bearing support base (among other things) the electrodes and the substrate within the case. Said operation is particularly complex and delicate, as there is a high risk of damaging (even seriously) the substrate; consequently, in order to preserve the integrity of the substrate, this operation is carried out very slowly (i.e. with a very low hourly productivity).

It has therefore been noted that these methods for the production of disposable cartridge have the drawback of being inefficient, as for maintaining an acceptable production quality it is required to operate very slowly (i.e. with a very low hourly productivity). In addition, damaging on the substrate or on the electrodes frequently occurs (essentially unwanted deformations of the electrodes) during the handling of the electrodes needed for transferring the electrodes from the containers to the coupling members.

Patent Application WO2015123558A2 describes a method for assembling a disposable cartridge for electronic cigarettes.

DESCRIPTION OF THE INVENTION

The object of the present invention is to provide a manufacturing machine for the production of disposable cartridges for electronic cigarettes that is free from the drawbacks of the state of the art and, at the same time, is both easy and inexpensive to implement.

According to the present invention a manufacturing machine for the production of disposable cartridges for electronic cigarettes is provided, as claimed in the appended claims.

BRIEF DESCRIPTION OF THE DRAWINGS

The present invention will now be described with reference to the accompanying drawings, which illustrate some examples of non-limiting embodiments, wherein:

FIG. 4 is a schematic view and with parts removed for clarity of a branch of a first feeding system of FIG. 2;

FIG. 5 is a schematic view of a station for the insertion of the electrical connection terminals of FIG. 4;

PREFERRED EMBODIMENTS OF THE INVENTION

Figure 1:
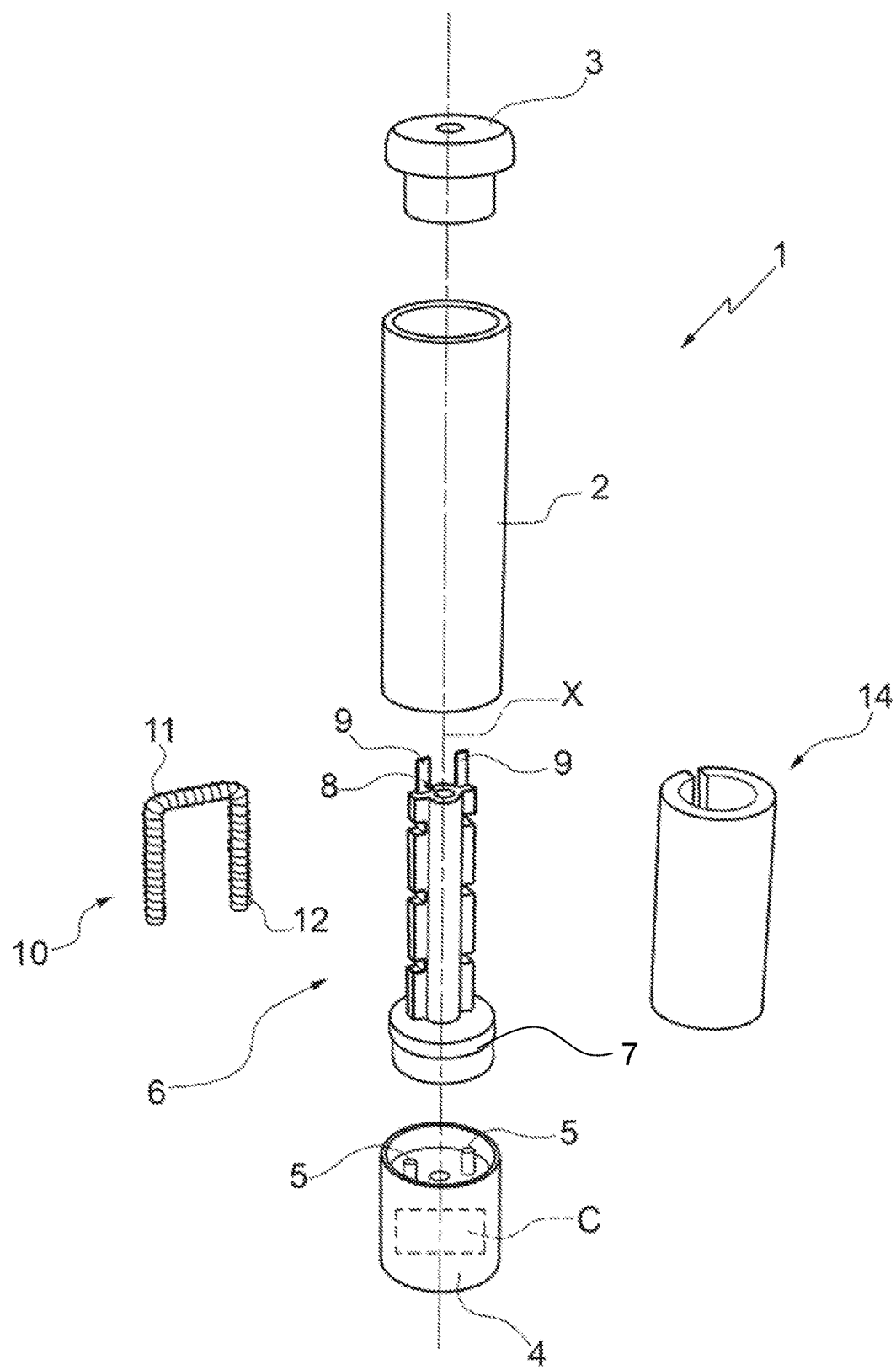
FIG. 1 is a schematic and exploded view of a disposable cartridge made by means of the manufacturing machine which is the object of the present invention.

In FIG. 1, number 1 denotes, as a whole, a disposable cartridge for a cylindrical-shaped electronic cigarette (of known type and not described in detail) which is screwed to a cylindrical-shaped reusable part (not illustrated) and which contains, among other things, an electric battery that provides the power necessary for the functioning of the electronic cigarette.

Each disposable cartridge 1 comprises a cylindrical case 2 which is internally hollow and an upper end thereof coupled to an upper cap 3 whereas the lower end is coupled to a support base 4 which is made of a plastic material (electrically insulating), having an axis X and houses, on the inside, an electronic circuit that is electrically connected to two signal electrodes 5. The disposable cartridge 1 furthermore comprises, a flow tube 6 made of a plastic material (electrically insulating) and provided with a base 7 which, in use, is coupled by means of welding to the support base 4. The flow tube 6 comprises a central channel 8 which is arranged, in use, coaxial to the axis X and acts as a support and, at the same time, as an insulating spacer to keep two electrodes 9 well separated from one another and suited to be connected to the signal electrodes 5. The two electrodes 9 are also electrically connected to a heating member 10, which comprises a wick 11 made of an electrically insulating material bent in a "U" shape and a thermistor 12 made of a wire spirally wound around U-shaped wick 11; at the two opposite ends of the wire two terminals are obtained, which are electrically connected to the corresponding electrodes 9 by means of welding.

Figure 2:
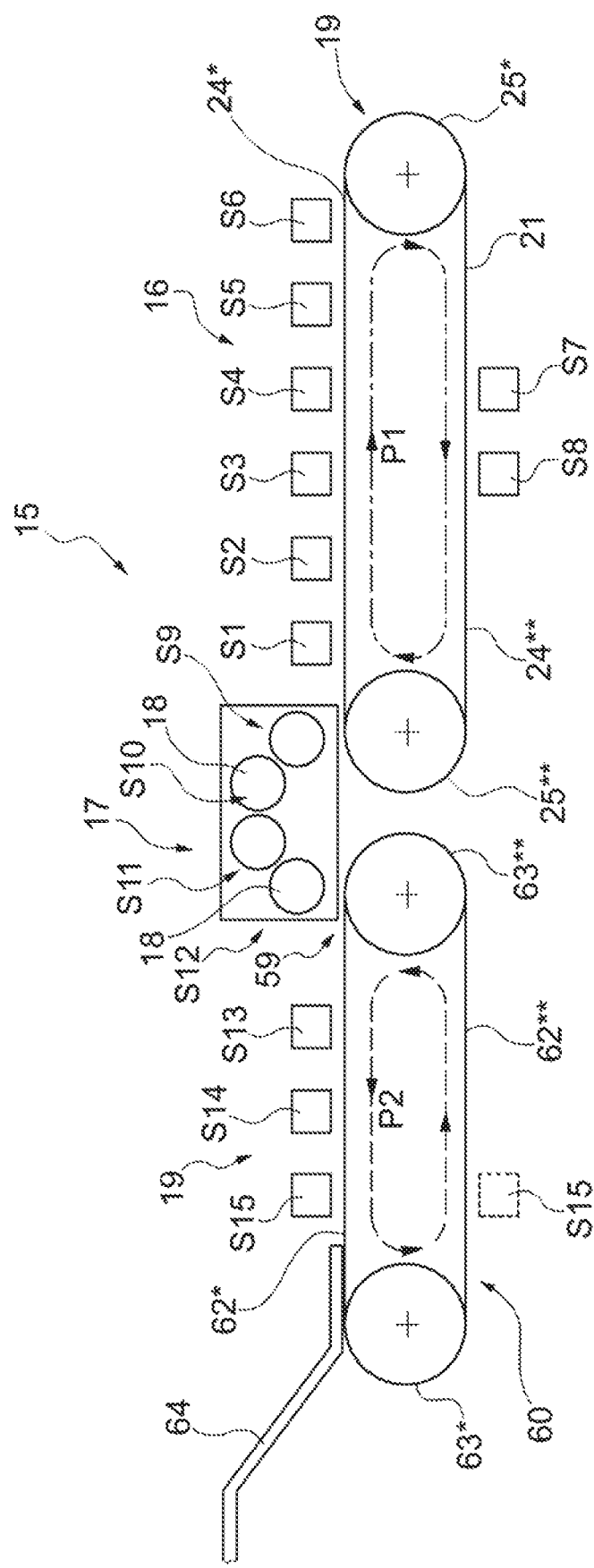
FIG. 2 is a schematic and front view of a manufacturing machine of the disposable cartridges of FIG. 1.

The disposable cartridge 1 furthermore comprises, a substrate 14 (for example a cotton pad) which is impregnated with a viscous liquid substance containing nicotine and possible flavours. The substrate 14 has a coaxial cylindrical tubular shape, which is arranged, in use, coaxial to the axis X around the thermistor 12 of the heating member 10 so that in use the heat generated by the heating member 10 warms the substrate 14 causing a slow volatilization (vaporization) of the viscous liquid substance that impregnates the substrate 14. In FIG. 2, number 15 denotes as a whole a manufacturing machine for the production of disposable cartridges for electronic cigarettes as described above.

The manufacturing machine 15 comprises a feeding system 16 extending along a substantially elliptical forming path P1 and comprising a plurality of operating units arranged along the feeding system 16 and supplying corresponding components of the disposable cartridge 1.

Downstream of the feeding system 16 a forming unit 17 is provided, comprising a plurality of drums 18 (as better described in the following discussion), which receives the semi-finished disposable cartridges 1 from the feeding system 16 and transfers the same to a feeding system 19 which extends along a substantially elliptical forming path P2 and which also comprises a plurality of operating units arranged along the feeding system 19.

Figure 3:
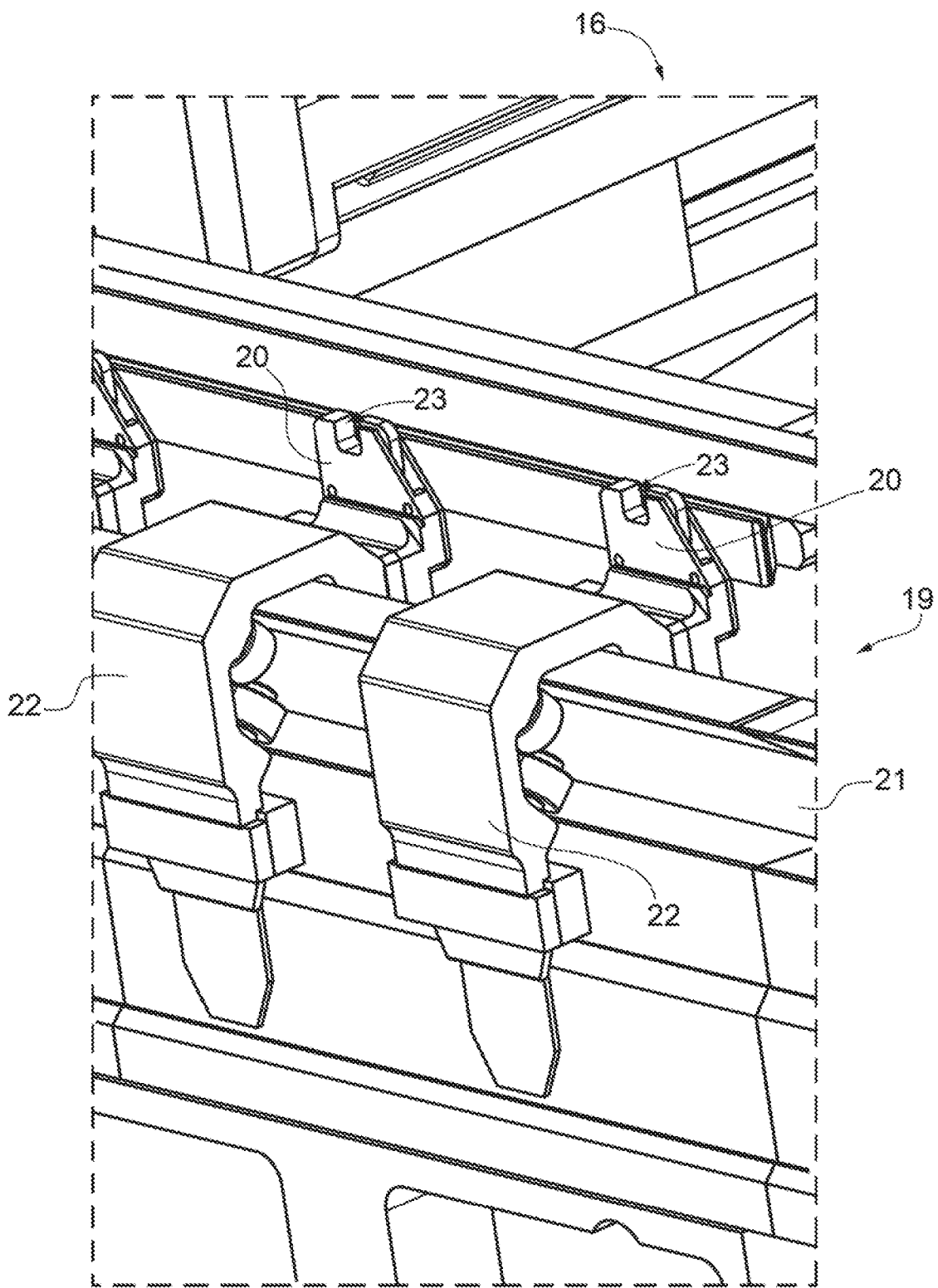
FIG. 3 is a perspective view of a moving assembly of a feeding system of FIG. 2.

The feeding system 16 comprises a linear conveyor 16* substantially elliptically extending, comprising a plurality of carriages 20 (illustrated in FIG. 3), independent of each other, adapted to receive, hold, and subsequently apply the components of the disposable cartridges 1. The conveyor 16* supports the carriages 20 and moves the same cyclically along the forming path P1 through a number of processing stations. The linear conveyor 16* comprises an annular guide (i.e. closed in a loop on itself) which is arranged in a fixed position and defines the forming path P1; in particular, the annular guide 21 is formed by a single fixed (i.e. without movement) rail, which is arranged along the forming path P1. In addition, the linear conveyor 16* comprises a plurality of slides 22, each of which supports a corresponding carriage 20 and is coupled to the annular guide 21 to slide freely along the annular guide 21. Finally, the linear conveyor 16* comprises a linear electric motor that moves the slides 22 carrying the carriages 20 along the forming path P1. According to a preferred alternative, the linear electric motor comprises an annular stator (i.e. a fixed primary one) which is arranged in a fixed position along the annular guide 21 and a plurality of movable sliders (i.e. movable secondary ones), each of which is electro-magnetically coupled to the stator so as to receive a driving force from the stator itself and is rigidly connected to a corresponding slide 22. According to a preferred alternative, the slides 22 are not provided with mechanical brake members; the stopping of the slides 22 at the desired positions is driven solely by means of the linear electric motor. Each slide 22 is operated intermittently, i.e. a non-continuous motion that provides a cyclic alternating of motion steps, wherein the slide 22 is moving to transfer between adjacent processing stations and stopping steps at the processing stations. The slides 22 are controlled independently from one another.

Each carriage 20 is provided with holding members (for example clamps) for tightening the components of the disposable cartridge 1 in the movement between one station and the other defining a seat 23 for housing the components of the disposable cartridge 1; each carriage 20 further comprises a cam actuation system for controlling the holding members.

As better illustrated in FIG. 2, the forming path P1 has an oval shape having two straight portions 24*, 24**, parallel and opposite to one another that are joined by two semi-circular portions 25*, 25** opposite to one another. According to a preferred alternative, the oval-shaped forming path P1 allows to utilize both straight portions 24*, 24** by providing processing stations in sequence in the area of both straight portions 24*, 24** thus limiting the encumbrance of the feeding system 16.

According to a further alternative not illustrated, the forming path P1 has an oval shape and the processing stations are arranged beside one another and in sequence in the area of a single straight portion 24*, 24**.

The slides 22 travel along the forming path P1 in a clockwise direction through a station S1 for the insertion of the support base 4, a station S2 for controlling the orientation of the support base 4, a station S3 for the insertion of the signal electrodes 5, a station S4 for the insertion of the electronic processors C, a station S5 for coupling the support base 4 to the flow tube 6, a station S6 for welding the support base 4 to the flow tube 6, a controlling and checking station S7 and a discarding station S8. According to a first alternative, the stations denoted with references from S1 to S6 are arranged along the upper straight portion 24* and the stations denoted with S7 and S8 are arranged along the lower straight portion 24**. The carriages 20 are arranged on the sides of the respective slides 22 facing, in use, the different stations S1-S8, receive a plurality of discrete elements and deliver a semi-finished disposable cartridge 1 to the forming unit 17. The stations S1-S8 are all arranged on the same side of the annular guide 21.

As illustrated in FIG. 4, each slide 22 is controlled until it is arranged in the area of the insertion station S1, so that the seat 23 of the respective carriage 20 is in a position directly facing the exit of a vibrating collecting container 26 for the support bases 4. Within the vibrating collecting container 26, a channel 27 is provided for the downward movement of the individual support bases 4 fed in a disorderly mass from above. At the bottom of the collecting container 26, the support bases 4 are oriented with the axis X substantially horizontal and orthogonal to the straight portion 24*. The insertion station S1 comprises a pusher element 28, which is arranged in a position facing the exit of the vibrating collecting container 26 on the opposite side with respect to the carriage 20. The pusher member 28 is movable along a direction orthogonal to the straight portion 24*. The pusher member 28 advances to intercept the support base 4 and to allow the insertion of the support base 4 into the respective seat 23.

Subsequently, the slide 22 is controlled until is arranged in the area of the station S2 to control the orientation of the support base 4 provided with a member 29, which is designed to rotate the support base 4 until the desired orientation is obtained. The orienting station S2 is provided with optical sensors to detect the orientation of the support base 4 coming from the insertion station S1; the member 29 is designed to rotate the support base 4 around the axis X according to the signal detected by said sensors.

The slide 22 is then advanced until it is aligned with the insertion station S3 in a position facing a conveyor belt 30 for the insertion of the signal electrodes 5. The insertion station S3 for the signal electrode 5 comprises a plurality of channels 31 for feeding a mass of casually oriented signal electrodes 5; according to a preferred alternative four channels 31 for feeding the signal electrodes 5 are provided. As better illustrated in FIGS. 5a and 5b, by means of a pick-and-place positioning system 32 for each channel 31, the signal electrodes 5 are picked up from the four channels 31, rotated (if necessary) to arrange the same with the correct orientation and inserted inside seats 33 obtained on the conveyor belt 30, which is arranged orthogonal to the four channels 31. The conveyor belt 30 transports the orderly mass of signal electrodes 5 in the area of a pusher element 34, which is arranged on the side of the conveyor belt 30 opposite to the carriage 20. The pusher member 34 is movable along a direction orthogonal to the straight portion 24*. The pusher member 34 advances to intercept the signal electrodes 5 and to allow the same to be inserted into the respective support base 4.

According to an alternative not illustrated, the insertion station S3 is provided with an additional pick-and-place positioning system that picks up the signal electrodes 5 from the seats 33 of the conveyor belt 30 and transfers them into a cavity cooperating with the pusher member, which advances to intercept the signal electrodes 5 and to allow the insertion of the same inside the respective support base 4.

The slide 22 is advanced until it is arranged at the insertion station S4 in a position facing a pick-and-place positioning system 35 for the insertion of the electronic processors C. An orderly mass of electronic processors C is conveyed by means of a conveyor belt 36 arranged perpendicular to the linear transport conveyor 16* and provided with seats for housing the individual electronic processors C; according to a further alternative, the orderly mass of processors C is fed by means of a spool. The pick-and-place positioning system 35 picks up the electronic processors C and transfers them into a cavity 37, which cooperates with a pusher member 38 which is arranged on the side of the conveyor belt 36 opposite with respect to the carriage 20. The pusher member 38 is movable along a direction orthogonal to the straight portion 24*. The pusher member 38 advances so as to intercept the electronic processors C and to allow the insertion of the same inside the respective support base 4.

Finally, downstream of the insertion station S4, a station S5 for coupling the support bases 4 to the respective flow tubes is provided. An orderly mass of flow tubes 6 (comprising both the support base 7 made of a plastic material and the electrodes 9) having the same orientation, are fed by means of a conveyor 39 up to an output station. At the output station, a slide picks up the individual flow tubes 6 so to couple a lower end of the same to a respective support base 4.

The feeding system 16 is further provided with a welding station S6 comprising a plurality of devices 40 for welding the support base 4 to the respective flow tubes 6; the welding devices 40 are equal and aligned to one another and, preferably, perform an ultrasonic welding. Each welding device 40 comprises a sonotrode 41 which transmits energy in the form of vibrations directly to the support bases 4 and to the flow tubes 6 which must be fixed to each other and it applies a welding pressure. In particular, each sonotrode 41 comprises a body, which extends longitudinally along an axis orthogonal to the straight portion 24*. The plurality of welding devices 40 is suited to perform the simultaneous machining, i.e. to simultaneously welding a flow tube 6 to the respective support base 4.

After travelling the straight portion 24*, the slides 22 travel through the semicircular portion 25* and subsequently the straight portion 24** along which the station S7 for controlling and checking the semi-finished disposable cartridge 1 obtained in the straight portion 24* is arranged. Downstream of the controlling and checking station S7 a discarding station S8 for defective or non-compliant disposable cartridges 1 is arranged.

In the feeding system 16, the various discrete elements (support base 4, electronic circuit C, signal electrodes 5, flow tube 6) are fed along paths orthogonal to the assembly direction. In the feeding system 16, the various discrete elements (support base 4, electronic circuit C, signal electrodes 5, flow tube 6) are fed on a horizontal plane along paths orthogonal to the forming path P1.

After travelling the straight portion 24, the slides 22 travel through the semicircular portion 25 until they are arranged at an output station facing a first drum 18A of the forming unit 17.

Along the forming unit 17, are arranged, in sequence, a S9 station for coupling the heating member 10 to the semi-finished disposable cartridge 1, a station S10 for bending the heating member 10, a station S11 for applying the substrate 14 and finally a station S12 for applying the substrate 14 which transfers the disposable cartridges 1, completed but without the upper cap 3, to the feeding system 19.

Figure 6:
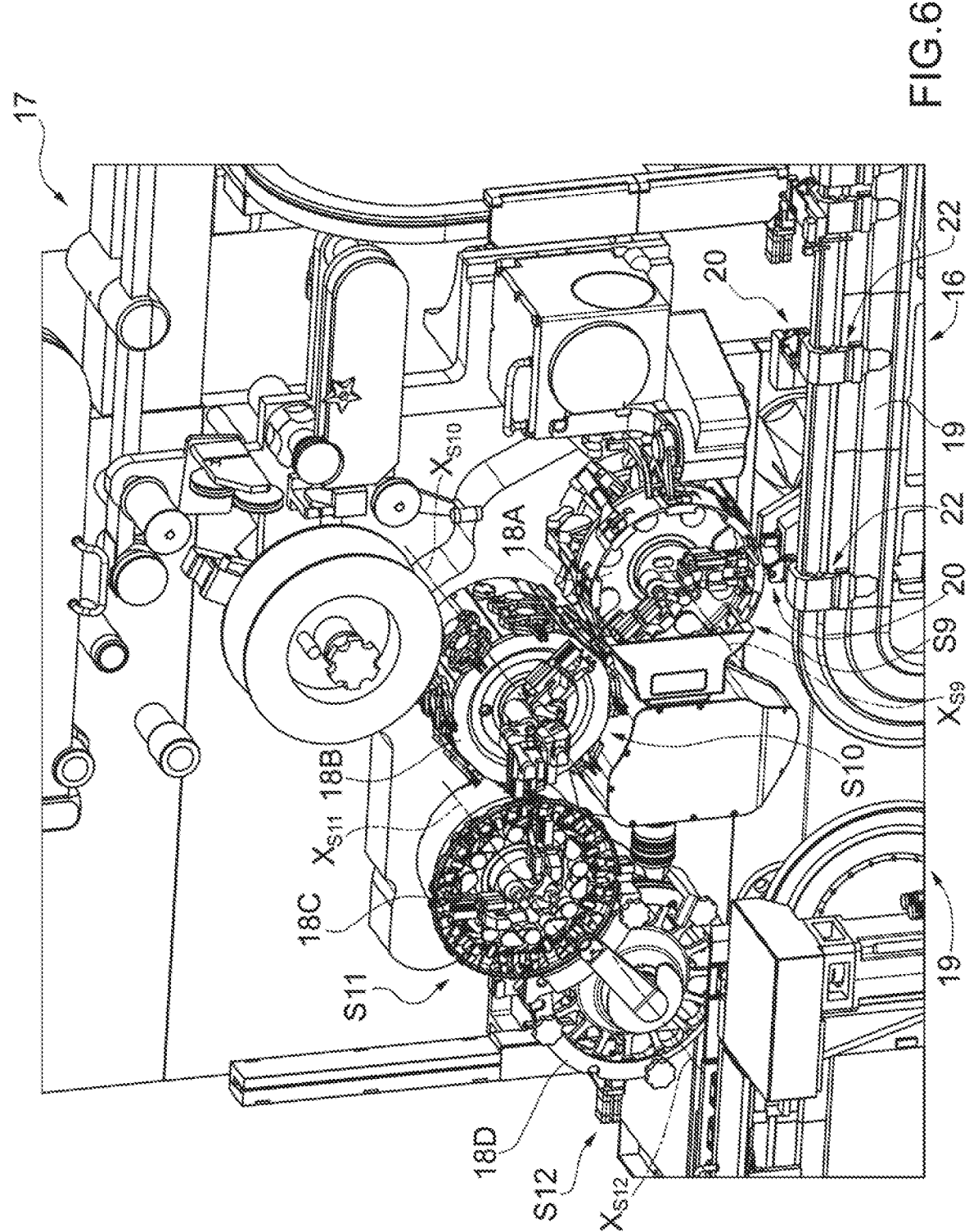
FIG. 6 is a front view of a forming unit of FIG. 2.

As illustrated in FIG. 6, the forming unit 17 comprises four feeding conveyors 18A, 18B, 18C and 18D which are formed as drums rotating around respective central rotation axes $X_S$ parallel to one another.

Figure 7:
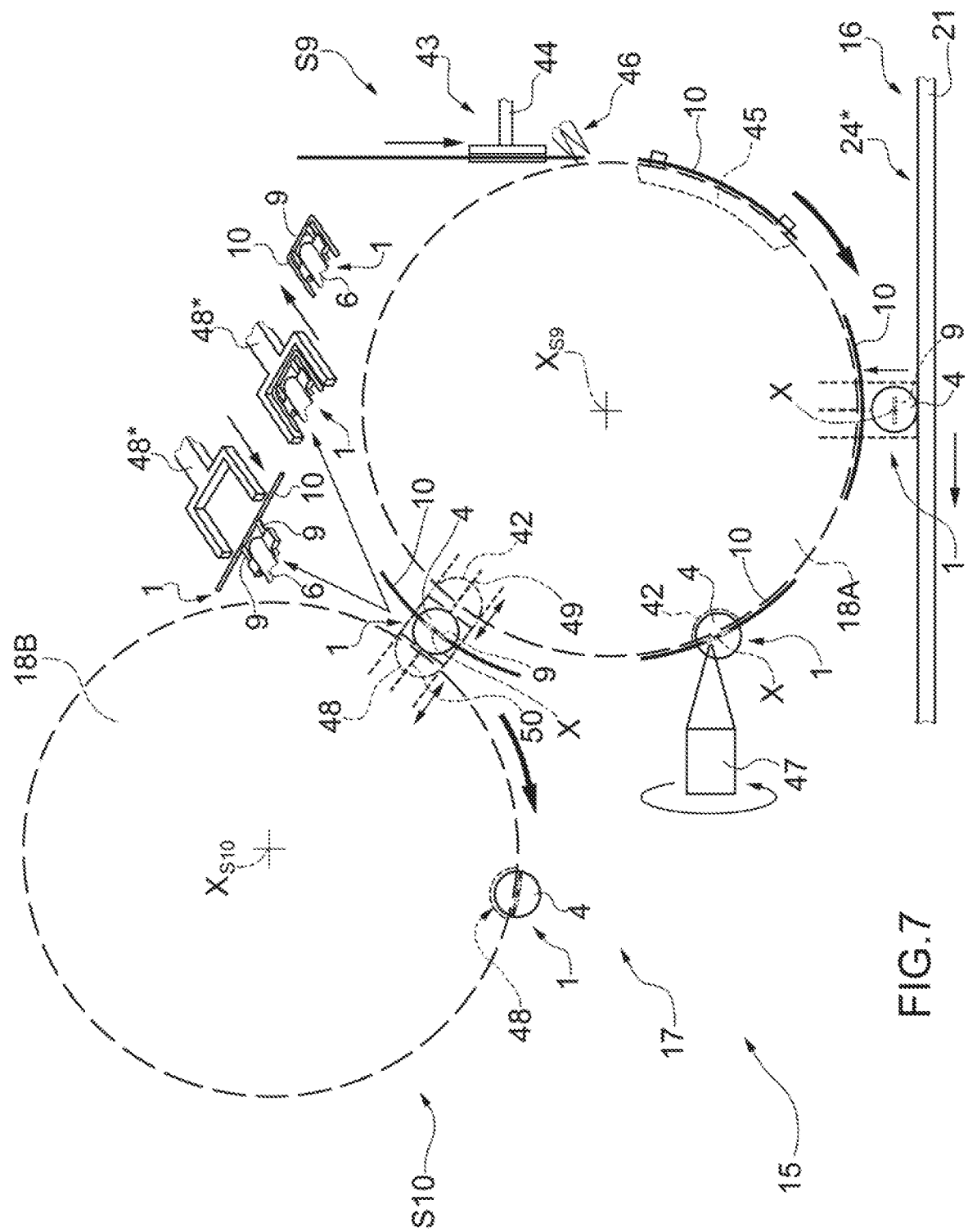
FIG. 7 is a perspective and schematic view of a station for coupling the heating member to a semi-finished disposable cartridge and of a bending station for the heating member of the forming unit of FIG. 6.
Figure 8:
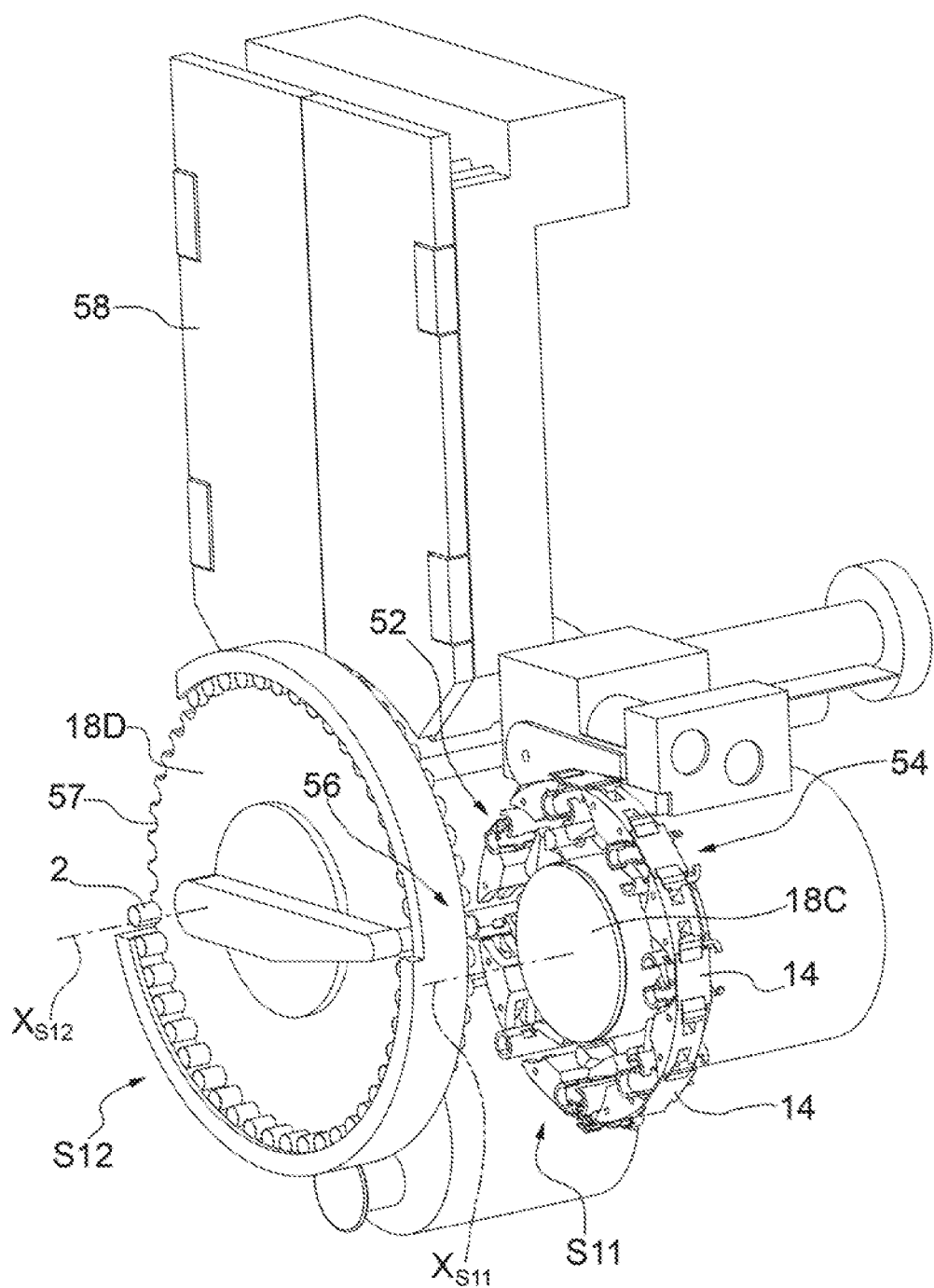
FIG. 8 is a perspective and schematic view of a station for applying the substrates and a subsequent station for applying the cases of the forming unit of FIG. 6.
Figure 9:
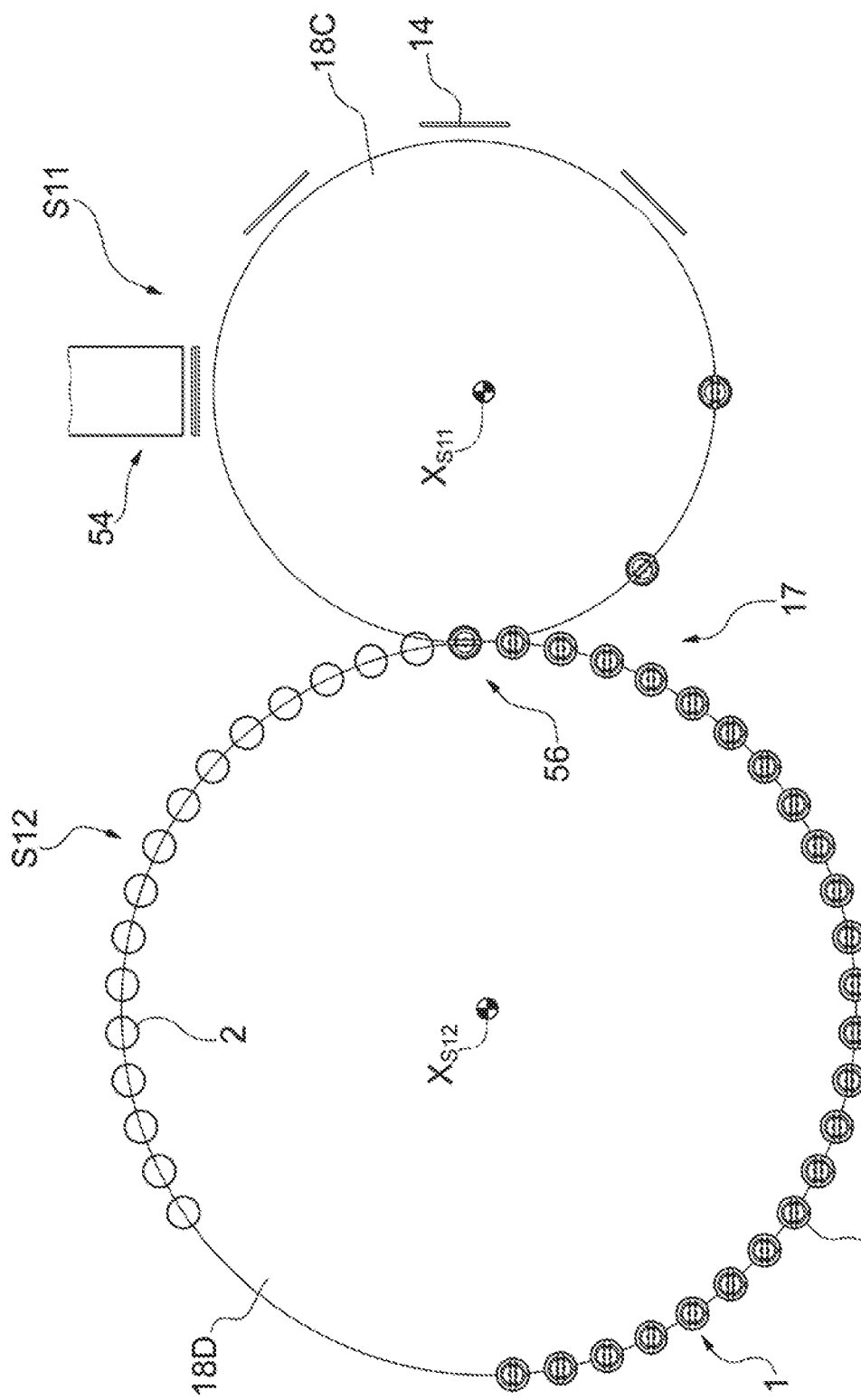
FIG. 9 is a front and schematic view showing the feeding of the materials in the stations of FIG. 8.
Figure 10:
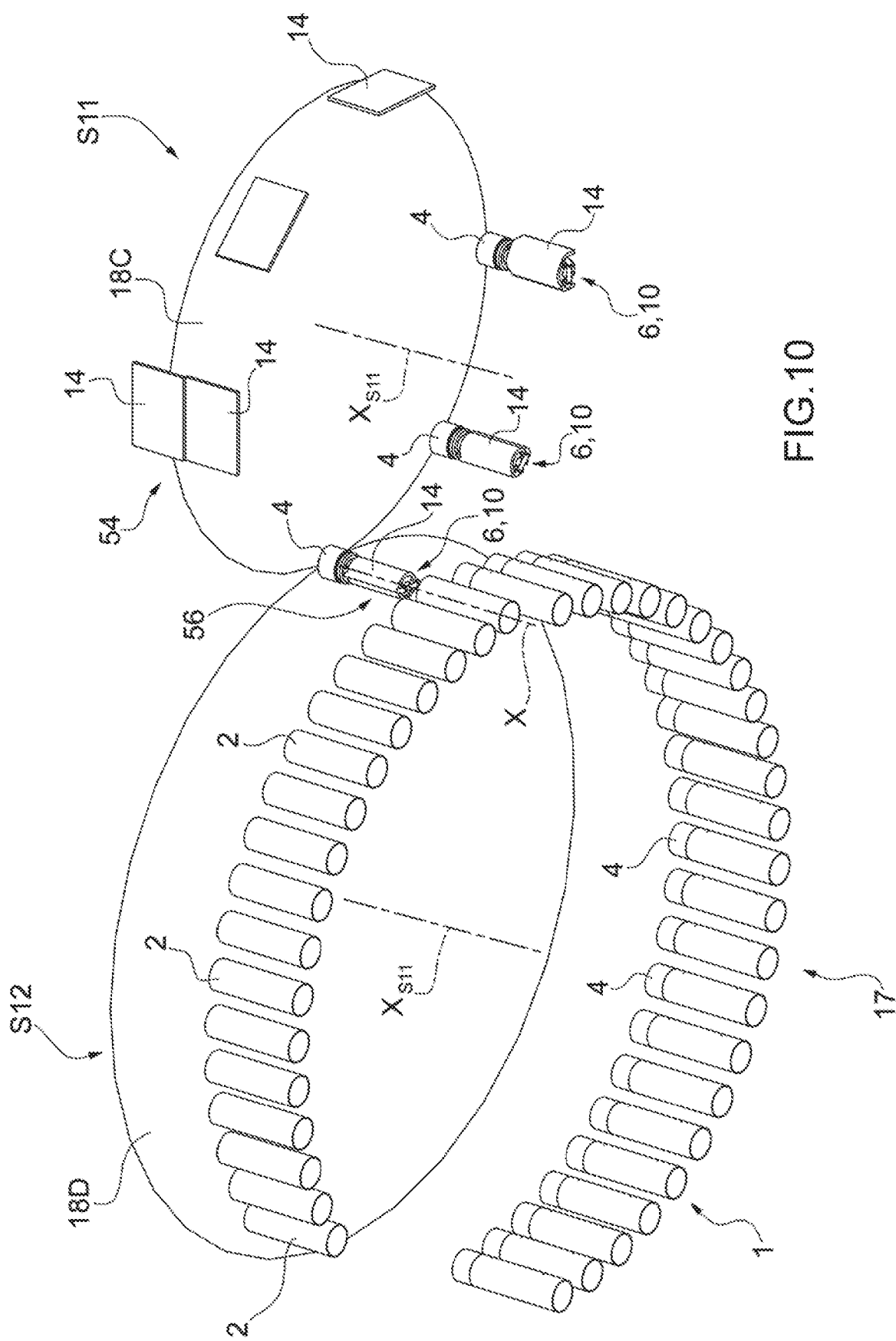
FIG. 10 is a perspective and schematic view which shows the feeding of the materials in the stations of FIG. 8.
Figure 11:
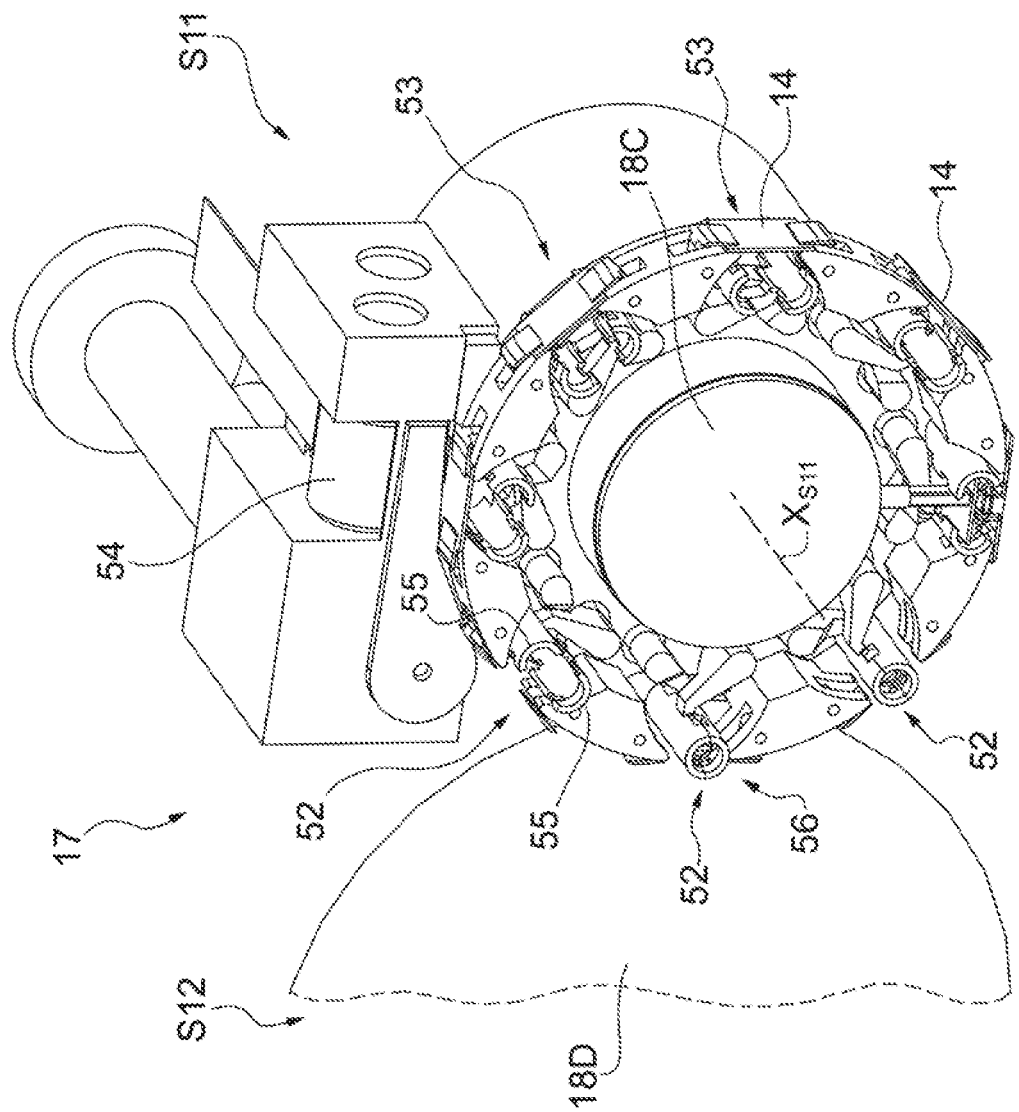
FIG. 11 is a perspective and schematic view of the station for applying the substrates.
Figure 12:
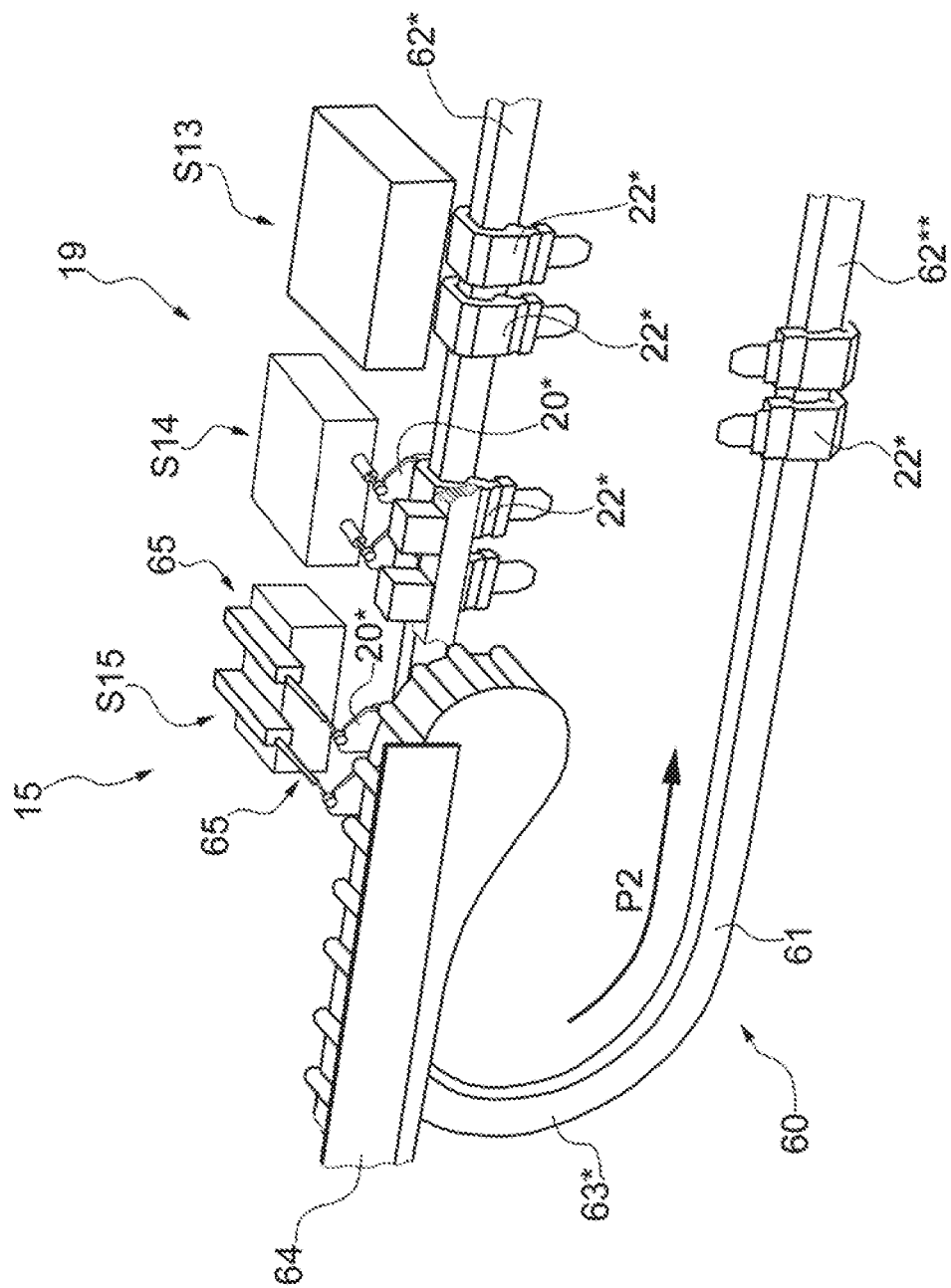
FIG. 12 is a schematic view and with parts removed for clarity of a second feeding system of FIG. 2.

As illustrated in FIG. 7, the station S9 for coupling the heating member 10 to the semi-finished disposable cartridge 1 comprises the drum 18A, which rotates in a clockwise direction around the rotation axis $X_{S9}$ and supports a plurality of peripheral seats 42; the transport conveyor 16* is partially superimposed in front of the drum 18A at the output station so that a semi-finished disposable cartridge 1 can be transferred axially (i.e. with a movement parallel to the rotation axis $X_{S9}$ of the drum 18A) from a respective carriage 20 to a seat 42 of drum 18A by means of a pusher member. The semi-finished disposable cartridges are housed within the seats 42 with their rotation axis X parallel to the rotation axis $X_{S9}$.

A device 43 for inserting the heating members 10 is also provided, which is arranged at the upper periphery of the drum 18A, upstream of the output station where the semi-finished disposable cartridges 1 are transferred to the seats 42 of the drum 18A. The heating members 10 are fed by a continuous belt wound in a spool in which the wire is already spirally wound around the wick of electrically insulating material. The continuous spool of material for obtaining the heating members 10 is unwound and fed within a movable guide of the device 43 for the insertion of the heating members 10. The guide 44 is movable in a vertical direction so as to accompany the descent of the material for obtaining the heating means 10 unwound by the spool and in a horizontal direction to facilitate the insertion of said material within the seats 42. The movable guide 44 in fact cooperates with the drum 18A to accompany the movement of the spool continuously unwound within the seats 42 of the drum 18A, which are provided with means 45 for holding the corresponding heating member 10. In particular, each seat is provided with clamps for holding the unbent heating member 10; according to a preferred alternative, each seat 42 is also provided with an intake system for improving the holding of the unbent heating member 10 within the seat 42. The device 43 for the insertion of the heating members 10 comprises, furthermore, a cutting device 46, which cyclically performs a cross cutting of the spool so as to separate a sequence of heating members 10 with a desired length. Each unbent heating member 10 is housed within the respective seat so that it is arranged in a position directly facing the electrodes 9. Inside the seat 42, the heating member 42 has a linear development and is arranged orthogonal to the rotation axis X of the semi-finished disposable cartridge 1.

Along the periphery of the drum 18A, downstream of the output station wherein the semi-finished disposable cartridges 1 are transferred to the seats 42 of the drum 18A, a station is provided, for welding the two electrodes 9 to the respective heating member 10. The welding station comprises a single welding device 47 which preferably performs a laser welding of the heating member 10 to each of the two electrodes 9. In particular, the welding device 47 comprises a movable laser head which, during a stopping step of the drum 18A, travels through an elliptical trajectory during which it performs the two welding points.

The station S10 for bending the heating member 10 comprises the drum 18B, which rotates in a clockwise direction around the rotation axis $X_{S10}$ and supports a plurality of peripheral seats 48; the drum 18A faces the drum 18B at a passing station wherein a pusher member 49 travels through the seat 42 of the drum 18A so as to axially push the semi-finished disposable cartridge 1 and a counter-pusher element 50, which is aligned and opposite the pusher member 49 and travels through the seat 48 of the drum 18B to accompany the axial movement of the semi-finished disposable cartridge 1 on the opposite side with respect to the pusher member 49.

The semi-finished disposable cartridges are housed inside the seats 48 with their rotation axis X parallel to the rotation axis $X_{S10}$. The bending station S10 comprises a device 48* for bending the movable heating member 20 inside the seat 48 which, by intercepting the heating member 10, bends it in a "U" shape around the flow tube 6. It is important to note that during this step of bending in a "U" shape the heating member 10, the welding points of the heating member 10 to each of the two electrodes 9 previously made are not unnecessarily stressed.

Once the bending in a "U" shape of the heating member 10 is performed, the semi-finished disposable cartridge 1 is transferred to the drum 18C, which rotates in a clockwise direction around the rotation axis $X_{S11}$, is arranged adjacent to the drum 18B for the application of the substrate 14. As better illustrated in Figures from 8 to 11, the station S11 for the application of the substrate 14 comprises an insertion device 51 for inserting each disposable cartridge 1 (provided with the support base 4, the flow tube 6 and the "U"-bent heating member 10 previously applied) from a pocket 48 of the drum 18B on the inside of a corresponding holding head 52 of the drum 18C thus intercepting the substrate 14 which is housed in the corresponding pocket 53 and bends in a "U" shape around heating member 10 entering the holding head 52.

Each holding head 52 of the drum 18C is in fact coupled to a pocket 53, which is arranged radially outermost from the holding head 52 and is adapted to receive and hold a corresponding rectangular shaped substrate 14 and initially flat so that the substrate itself is arranged in front of the holding head 52. Preferably, each pocket 53 comprises two opposed hooks that are hinged to drum 18C and hold a corresponding flat substrate 14 against an outer surface of the drum 18C.

A device 54 for inserting the substrates 14 is provided, which is arranged in the area of the upper periphery of the drum 18C and is suited to insert, in sequence, the flat substrates 14 into the corresponding pockets 53; the insertion device 54 receives a continuous belt of hygroscopic material coming from a spool and cyclically performs a cross cutting of the continuous belt of hygroscopic material to separate a succession of flat substrates 14 that are inserted into corresponding pockets 53.

According to a preferred alternative, each holding head 52 has a tubular shape and is formed by two shell-shaped elements 55 (having a semi-circular cross-section), which are movable with respect to one another between an open position, wherein the two shell-shaped elements 55 are arranged at a certain distance from one another and a closed position, wherein the two shell-shaped elements 55 are arranged in mutual contact. In particular, in each holding head 52, the two shell-shaped elements 55 are hinged to the drum 18C to move one with respect to the other by means of corresponding rotations.

The shell-shaped elements 55 of each holding head 52 are arranged in the open position to allow a radial entry of the semi-finished disposable cartridge 1 coupled to the substrate 14 wound around the heating member 10 and of the flow tube 6 and are arranged in the closed position after the entry to bend the hygroscopic swab 14 in a tube-shape around the heating member 10 and the flow tube 6. In other words, in each holding head 52, the initially flat substrate is intercepted by the semi-finished disposable cartridge 1 coming from drum 18B which, by entering into the holding head 52 (with the shell-shaped elements 55 arranged in the open position) bends in a "U" shape around the disposable cartridge 1; once the disposable cartridge 1 is fully inserted into the holding head 52, the shell-shaped elements 55 of the holding head 52 are brought to the closed position to bend the substrate 14 in a tube-shape around the heating member 10 and the flow tube 6.

Once the substrate 14 is applied, a transfer device 56 is arranged to axially remove the semi-finished disposable cartridge 1 (provided, among other things, with the heating member 10 and with the substrate 14 bent in a tube-shape) from the holding head 52 when the shell-shaped elements 55 of the holding head 52 are still in the closed position.

The station S12 for applying the case 2 comprises the drum 18D, which rotates in a clockwise direction around the rotation axis $X_{S12}$ and supports a plurality of peripheral seats 57; the drum 18D is partially superimposed in front of the drum 18C at the transfer device 56 so that a semi-finished disposable cartridge 1 can be axially transferred (that is, with a movement parallel to the rotation axis $X_{S12}$ of the drum 18A) by a respective holding head 52 to a seat 57 of the drum 18D by means of a pusher member. The semi-finished disposable cartridges 1 are housed inside the seats 57 with their rotation axis X parallel to the rotation axis $X_{S12}$.

A hopper 58 is coupled to the drum 18D, which receives a disorderly mass of cases 2 coming from a device for feeding the cases 2; a lower outlet mouth of the hopper 58 is arranged at a periphery of the drum 18D and a pusher member is provided, which is provided with an alternate movement along a direction parallel to the rotation axis $X_{S12}$ of drum 18D, which intercepts the cases 2 and cyclically pushes the same out of the lower outlet mouth of the hopper 58 until inserted into corresponding seats 57 of the drum 18D.

Each seat 57 of the drum 18D is axially aligned with a corresponding holding head 52 of the drum 18C so that the disposable semi-finished cartridge 1 is axially picked up from the holding head 52 and is axially inserted into the case 2 carried by the seat 57 of the drum 18D by means of the action of the transfer device 56. According to a preferred embodiment, each holding head 52 of the drum 18C has internally a flared shape that progressively reduces at an output end to radially compress the substrate 14 bent in a tube-shape (which has the possibility to elastically deform without damage) so as to facilitate the entry into the corresponding base 2.

Preferably, the transfer device 56 comprises a pusher element that passes through the holding head 52 of the drum 18C to axially push the semi-finished disposable cartridge 1 and a counter-pusher element, which is aligned and opposite the pusher element and travels across the seat 57 of the drum 18D so as to accompany the axial movement of the semi-finished disposable cartridge 1 on the opposite side with respect to the pusher. Preferably, the transfer device 56 also comprises a rotary device capable of bringing the corresponding case 2 into rotation during the axial insertion of the semi-finished disposable cartridge 1 so as to facilitate the insertion of the same into the base 2.

Finally, the drum 18D comprises a transfer device 59, which is provided with a pusher element travelling through the seat 57 of the drum 18D to axially push the disposable cartridge 1 inside a carriage of the feeding system 19 (as better described in the following discussion).

The feeding system 19 is totally similar to the feeding system 16, it also comprises, as well, a linear transport conveyor 60 substantially elliptically extending, which comprises a plurality of carriages 20* (illustrated in FIG. 3), independent of each other, and adapted to receive and hold the disposable cartridges 1. The linear transport conveyor 60 supports the carriages 20* and moves the same cyclically along the forming path P2 which travels through a number of processing stations. The linear transport conveyor 60 comprises an annular guide 61 (i.e. closed in a loop on itself) which is arranged in a fixed position and defines the forming path P2; in particular, the annular guide 61 is formed by a single fixed (i.e. without movement) rail, which is arranged along the forming path P2. In addition, the linear transport conveyor 60 comprises a plurality of slides 22*, each of which supports a corresponding carriage 20* and is coupled to the annular guide 61 to slide freely along the annular guide 61. Finally, the linear transport conveyor 60 comprises a linear electric motor that moves the slides 22* carrying the carriages 20* along the forming path P2. According to a preferred alternative, the linear electric motor comprises an annular stator (i.e. a fixed primary one) which is arranged in a fixed position along the annular guide 61 and a plurality of movable sliders (i.e. movable secondary ones), each of which is electro-magnetically coupled to the stator so as to receive a driving force from the stator itself and is rigidly connected to a corresponding slide 22*. According to a preferred alternative, the slides 22* are not provided with mechanical brake members; the stopping of the slides 22* at the desired positions is driven solely by the linear electric motor. Each slide 22* is operated intermittently, i.e. a non-continuous motion that provides a cyclic alternating of motion steps, wherein the slide 22* is moving to transfer between adjacent processing stations, and stopping steps at the processing stations. The slides 22* are independently controlled from one another.

Each carriage 20* is provided with holding members (e.g. clamps) for tightening the disposable cartridges 1 in the movement between one station and the other, which define a seat for housing the disposable cartridges 1; each carriage 20* further comprises a cam actuation system for controlling the holding members.

The forming path P2 has an oval shape having two straight portions 62*, 62**, parallel and opposite to one another that are joined by two semi-circular portions 63*, 63** opposite to one another. The oval-shaped forming path P2 allows to use only one straight portion 62*, 62** on which to place the processing stations or, alternatively, to place the processing stations at both straight portions 62*, 62** so as to limit the encumbrance of the feeding system 19.

The slides 22* travel along the forming path P2 in a clockwise direction, pick up the semi-finished disposable cartridges 1 at a loading station facing the drum 18D of the forming unit 17, in which the pusher member of the transfer device 59 moves each disposable cartridge 1 from the drum 18D to the inside of a respective carriage 20*, and deliver the disposable cartridges 1 completed but without the upper cap 3 to an output conveyor 64, by travelling through a welding station S13 of the case 2 of each disposable cartridge 1, to the respective support base 4, to a station S14 for checking the electronic circuit C and to a station S15 for discarding defective disposable cartridges 1.

The stations S13-S15 are all arranged on the same side of the annular guide 61. According to a first alternative, the welding station S13, the station S14 for checking the electronic circuit C and the discarding station S15 are all arranged along the straight portion 62*. According to a further alternative, the welding station S13 and the station S14 for checking the electronic circuit C are arranged along the straight portion 62* whereas the discarding station S15 is arranged on the straight portion 62**.

The welding station S13 comprises a plurality of welding devices which are equal and aligned to one another, which preferably perform an ultrasonic welding of the case 2 to the support base 4. Each welding device comprises a sonotrode, which transmits energy in the form of vibrations directly to the support bases 4 and to the flow tubes 6 which must be fixed to each other and it applies a welding pressure. In particular, each sonotrode 41 comprises a body, which extends longitudinally along an axis orthogonal to the straight portion. The plurality of welding devices is suited to perform the simultaneous machining, i.e. for simultaneously welding a case 2 to the respective support base 4.

Along the straight portion 62*, downstream of the welding station S13 of the case 2, of each disposable cartridge 1, to the respective support base 4, the station S14 for controlling and checking the electronic circuit C contained within the disposable cartridge 1 is obtained.

According to a first embodiment, along the straight portion 62*, downstream of the station S14 for controlling and checking the electronic circuits C, the station S15 for discarding disposable cartridges 1, whose electronic circuit C is non-compliant, is arranged. At one end of the straight portion 62*, downstream of the discarding station S15, an output station is provided comprising at least one pusher element 65 (preferably two pusher elements 65) which is arranged in a position facing the output conveyor 64 and is movable along a direction orthogonal to the straight portion 62*. The linear transport conveyor 60 is interposed between the pusher element 65 and the output conveyor 64; the pusher element 65 advances to intercept the disposable cartridges 1 of the carriages 20* and to allow the insertion of the disposable cartridges 1 inside the compartments of the output conveyor 64. After travelling across the straight portion 62*, the slides 22*, then, travel, in sequence, the semicircular portion 63*, the linear portion 62, and the semicircular portion 63 until being arranged at the transfer device 59 in a position facing the drum 18D of the forming unit 17 to pick up a new semi-finished disposable cartridge 1.

According to a further and more compact alternative, along the straight portion 62**, downstream of the station S14 for controlling and checking the electronic circuits C, an output station is provided, comprising the pusher element 65 which is arranged in a position facing the output conveyor 64 and is movable along a direction orthogonal to the straight portion 62*. The linear transport conveyor 60 is interposed between the pusher element 65 and the output conveyor 64; the pusher element 65 advances to intercept the disposable cartridges 1 and to allow the insertion of the disposable cartridges 1 within the compartments of the output conveyor 64. After crossing the straight portion 62*, the slides 22** travel the semi-circular portion 63*. Along the linear portion 62 the station S15 for discarding disposable cartridges 1, whose electronic circuit C is non-compliant, is instead arranged. After travelling through the straight portion 63, the slides 22* travel the semicircular portion 63** until being again arranged in the area of the transfer device 59 in a position facing the drum 18D of forming unit 17 to pick up a new semi-finished disposable cartridge 1.

According to a further alternative, not illustrated, the feeding system 16 extending along the substantially elliptical forming path P1 and the feeding system 19 which is developed along the forming path P2 can be replaced by a single feeding system that develops along a substantially elliptical forming path and comprises a plurality of operating units which are arranged along the feeding system. The feeding system comprises a single linear transport conveyor, along which a plurality of carriages 20, 20* independent to one another are cyclically moved through a number of processing stations S1-S15. The forming path has an oval shape having two straight portions parallel and opposite to one another that are joined by two semicircular portions opposite to one another; along the upper straight portion a forming unit 17 is also provided, which is provided with a plurality of drums.

According to a further alternative not illustrated, the forming unit 17 is provided with a single drum 18 or any number of drums 18 along which the processing stations S9-S12 are obtained.

The manufacturing machine 15 described herein has some advantages.

First, the manufacturing machine 15 described above allows to achieve a rather high hourly productivity (i.e. a number of pieces produced in a unit of time) of the order of three hundred disposable cartridges 1 per minute while guaranteeing a high qualitative standard of the disposable cartridges 1. Clearly, to ensure high productivity (in the order of three hundred disposable cartridges 1 per minute), it could be necessary to increase the number of devices that work in parallel at some stations; for example, it could be necessary to double the containers 26 for containing the support bases 4 or the members 29 designed to rotate the support bases 4 until arranging the same with the desired orientation.

In addition, the above-described manufacturing machine 15 allows the disposable cartridges 1 to be produced in a fully automatic manner without the intervention of operators, is extremely flexible and provides adequate manoeuvring spaces around each component and therefore simplifies both the initial assembly of the components, and the subsequent maintenance (from simple cleaning to replacement) of the components themselves.

In addition, it is important to note that the feeding systems 16, 19 are provided with slides 22, and 22* operated independently one from the other, thus allowing to vary the speed of the same along the forming path P1, P2 and to use the portions (straight and/or curved) where no application stations of elements are provided, so as to optimize the total cycle time.

The invention claimed is:

1. A manufacturing machine (15) for the production of disposable cartridges (1) for electronic cigarettes provided with a base (4); a support body (6), which is coupled to the base (4) and is provided with a number of electrodes (9) suited to be electrically connected to the base (4); an electronic circuit (C), which is electrically connected to signal electrodes (5) housed inside the base; a heating member (10), which is electrically connected to the electrodes (9) and a substrate (14) impregnated with a liquid substance, which surrounds the heating member (10) so that, when in use, the heat generated by the heating member (10) warms the substrate (14) causing a volatilization of the liquid substance; the manufacturing machine (15) comprises:

a first feeding conveyor (16), which feeds semi-finished disposable cartridges (1) along a first forming path (P1, P2); and a number of operating stations (S1-S8, S13-S15), which are arranged along the first forming path; wherein the operating stations are designed to alternatively carry out supplying of corresponding components of the semi-finished disposable cartridges carried by the first feeding conveyor or to carry out a processing of the components of the semi-finished disposable cartridges; wherein the first feeding conveyor comprises:

a first annular guide (21, 61), which is arranged in a fixed position along the first forming path;

a number of slides (22, 22*), each of which is coupled to a respective carriage (20, 20*) designed to house the semi-finished disposable cartridges and is coupled to the first annular guide so as to freely slide along the first annular guide independently of the other slides; and a linear electric motor, which comprises a stator, which is arranged in a fixed position along the first annular guide, and a number of movable sliders, wherein each movable slider is electro-magnetically coupled to the stator so as to receive a driving force from the stator and is rigidly connected to a respective slide;

wherein the number of operating stations (S1-S8, S13-S15) comprises a first station (S1) for insertion of the bases (4) and a second station (S3), arranged downstream of the first station (S1), for supplying the signal electrodes (5) and inserting the signal electrodes (5) into each base (4); and wherein, in the second station (S3), at least one channel (31) supplies a mass of signal electrodes (5) to a conveyor belt (30) from which the signal electrodes (5) are transferred into the bases (4).

2. The machine according claim 1, wherein each carriage is provided with members controlled by means of a cam actuation system, which define a seat (23) to house the components of the semi-finished disposable cartridge and are designed to hold the respective semi-finished disposable cartridge in a movement between an operating station and another operating station.

3. The machine according to claim 1, wherein said number of operating stations are arranged beside one another and in sequence along a first straight portion (24*, 62*) of the first annular guide, which defines the first forming path (P1, P2).

4. The machine according to claim 1, wherein the first forming path has an oval shape having two straight portions (24*, 24**, 62*, 62**), which are opposite and parallel to one another; said number of operating stations are arranged beside one another and in sequence along both straight portions.

5. The machine according to claim 1, wherein:
the first station (S1) for the insertion of bases (4) is provided along the first forming path;
the first station (S1) comprises a vibrating collecting container (26), which supplies, to a respective slide, each base (4) presenting an axis (X) that is oriented orthogonally relative to a feeding direction;
a third station (S5) is provided for supplying support bodies provided with electrodes; and
a fourth station (S6) is provided for coupling the bases to the respective support bodies, which comprises a plurality of devices (40) to weld the bases to the respective support bodies.

6. The machine according to claim 5 and comprising a fifth station (S2) for changing the orientation of the bases, which is arranged downstream of the first station (S1) for the insertion of the bases; and comprising a member (29), which is designed to rotate the bases around the axis (X) until they assume a desired orientation based on a signal transmitted by sensors designed to detect the orientation of the bases.

7. The machine according to claim 5, wherein, in the second station (S3), a plurality (31) of channels supply a mass of signal electrodes to the conveyor belt (30) from which the signal electrodes (5) are transferred into the bases (4).

8. The machine according to claim 7, wherein the second station (S3) for supplying the signal electrodes comprises a pick-and-place positioning system (32) for each channel, which picks up randomly oriented electrodes from the channel, rotates them so as to arrange them with a correct orientation and supplies them to the conveyor belt.

9. The machine according to claim 5 and comprising, downstream of the first station (S1) for the insertion of the bases, a sixth station (S4) for supplying electronic circuits and for inserting them into the bases, which comprises a pick-and-place positioning system (35), which picks up the electronic circuits from a conveyor (36) and transfers them into the bases.

10. The machine according to claim 5 and comprising, downstream of the first station (S1) for the insertion of the bases, a sixth station (S4) for supplying the electronic circuits fed by a continuous belt wound in a spool and for inserting them into the base.

11. The machine according to claim 1 and comprising a forming unit (16), which is arranged downstream of the first feeding conveyor and comprises a first winding conveyor (18), which is formed as a drum (18) rotating around a rotation axis (XS) and supports a plurality of seats (42, 48, 57), which are designed to receive the semi-finished disposable cartridges from the first feeding conveyor; wherein, in an area of the first winding conveyor, a number of second operating stations (S9-S12) are provided, which are designed to alternatively carry out the supplying of a corresponding component of the semi-finished disposable cartridges or to carry out a processing of the components of the same semi-finished disposable cartridges.

12. The machine according to claim 11, wherein the forming unit comprises a plurality of winding conveyors (18) which are formed as drums (18) rotating around respective rotation axes (XS) that are parallel to one another; wherein the second operating stations (S9-S12) are arranged in the area of said plurality of winding conveyors (18).

13. The machine according to claim 11, wherein the heating member (10) comprises a wick (11) of electrically insulating material bent in a "U" shape and a thermistor (12) consisting of a wire spirally wound around the U-shaped wick and electrically connected to the electrodes; the forming unit comprises a station (S9) for coupling the heating member to the semi-finished disposable cartridge, and a station (S10) for bending the heating member in a "U" shape, which is arranged downstream of the station (S9) for coupling the heating member to the semi-finished disposable cartridge.

14. The machine according to claim 13, wherein the station for coupling the heating member to the semi-finished disposable cartridge comprises a station for supplying semi-finished disposable cartridges, which is axially transferred from the first feeding conveyor into a first seats (42) of the first winding conveyor (18A); and a device (43) for supplying heating members, which are fed from a continuous belt wound in a spool into the first seats, said device is arranged in an area of an upper periphery of the first conveyor upstream of the station for supplying the semi-finished disposable cartridges and comprising a cutting device (46), which cyclically cuts the spool so as to separate a sequence of heating members with a desired length.

15. The machine according to claim 14, wherein the first seats comprise means (45) for holding the corresponding heating member, which is not bent.

16. The machine according to claim 14, wherein the station for coupling the heating member to the semi-finished disposable cartridge comprises a welding device (47), which carries out a welding of the heating member to the electrodes and is arranged downstream of the station for supplying the semi-finished disposable cartridges.

17. The machine according to claim 16, wherein the station for bending the heating member in a "U" shape comprises at least one movable bending device (48*) which, by intercepting the heating member, bends it in a "U" shape around the support body (6).

18. The machine according to claim 13, wherein the forming unit comprises a station (S11) for supplying and applying substrates, which receives the semi-finished disposable cartridges from the station for coupling the heating member to the semi-finished disposable cartridge; wherein the station for supplying and applying the substrates comprises a second feeding conveyor (18C), which is provided with a plurality of holding heads (52), which are designed to contain a respective semi-finished disposable cartridge; and a device (54) for supplying the substrates, which is designed to place a rectangular and initially flat substrate in front of each holding head (52) so that an insertion of the semi-finished disposable cartridge into the holding head allows the substrate to be intercepted and bent, thus assuming a tubular shape around the semi-finished disposable cartridge.

19. The machine according to claim 18, wherein each disposable cartridge comprises a cylindrical case (2), which is internally hollow and has a lower end that is coupled to the base; wherein the forming unit comprises a station (S12) for supplying and applying the cases, which receives the semi-finished disposable cartridges from the station for supplying and applying the substrates and comprises a third feeding conveyor (18D), which is provided with a plurality of seats (57) designed to hold the case (5), into which the respective semi-finished disposable cartridge is fed in an axial manner.

20. The machine according to claim 11 and comprising a second feeding conveyor (19), which feeds the disposable cartridges (1) along a second forming path (P2) and a number of third operating stations (S13-S15) arranged along the second forming path; wherein the second feeding conveyor (19) receives the disposable cartridges from the forming unit and transfers them to an output conveyor (64).

21. The machine according to claim 20, wherein the second feeding conveyor comprises a second annular guide (61), which is arranged in a fixed position along the second forming path; a number of slides (22*), each of which is coupled to a respective carriage (20*) designed to house the disposable cartridges and is coupled to the second annular guide so as to freely slide along the second annular guide independently of the other slides; and a linear electric motor, which comprises a stator, which is arranged in a fixed position along the second annular guide, and a number of movable sliders, wherein each movable slider is electromagnetically coupled to the stator so as to receive a driving force from the stator and is rigidly connected to a respective slide.

22. The machine according to claim 20, wherein each disposable cartridge comprises a cylindrical case (2), which is internally hollow and has a lower end that is coupled to the base; along the second feeding conveyor, a station (S13) for welding the case (2) of each disposable cartridge to the respective base, a station (S14) for controlling and checking each disposable cartridge, and a station (S15) for discarding defective disposable cartridges are provided.

23. A manufacturing machine (15) for the production of disposable cartridges (1) for electronic cigarettes provided with a base (4); a support body (6), which is coupled to the base (4) and is provided with a number of electrodes (9) suited to be electrically connected to the base (4); a heating member (10), which is electrically connected to the electrodes (9) and a substrate (14) impregnated with a liquid substance, which surrounds the heating member (10) so that, when in use, the heat generated by the heating member (10) warms the substrate (14) causing a volatilization of the liquid substance; the manufacturing machine (15) comprises:
- a first feeding conveyor (16), which feeds semi-finished disposable cartridges (1) along a first forming path (P1, P2);
- a number of operating stations (S1-S8, S13-S15), which are arranged along the first forming path; wherein the operating stations are designed to alternatively carry out supplying of corresponding components of the semi-finished disposable cartridges carried by the first feeding conveyor or to carry out a processing of the components of the semi-finished disposable cartridges; and
- a forming unit (16), which is arranged downstream of the first feeding conveyor and comprises a first winding conveyor (18), which is formed as a drum (18) rotating around a rotation axis (XS) and supports a plurality of seats (42, 48, 57), which are designed to receive the semi-finished disposable cartridges from the first feeding conveyor;
- wherein, in an area of the first winding conveyor, a number of second operating stations (S9-S12) are provided, which are designed to alternatively carry out the supplying of a corresponding component of the semi-finished disposable cartridges or to carry out a processing of the components of the same semi-finished disposable cartridges;
- wherein the heating member (10) comprises a wick (11) of electrically insulating material bent in a "U" shape and a thermistor (12) consisting of a wire spirally wound around the U-shaped wick and electrically connected to the electrodes; the forming unit comprises a station (S9) for coupling the heating member to the semi-finished disposable cartridge, and a station (S10) for bending the heating member in a "U" shape, which is arranged downstream of the station (S9) for coupling the heating member to the semi-finished disposable cartridge; and
- wherein the station for coupling the heating member to the semi-finished disposable cartridge comprises a station for supplying semi-finished disposable cartridges, which is axially transferred from the first feeding conveyor into a first seats (42) of the first winding conveyor (18A); and a device (43) for supplying the heating members, which are fed from a continuous belt wound in a spool into the first seats, said device is arranged in an area of an upper periphery of the first conveyor upstream of the station for supplying the semi-finished disposable cartridges and comprising a cutting device (46), which cyclically cuts the spool so as to separate a sequence of heating members with a desired length.

24. The machine according to claim 23, wherein the first seats comprise means (45) for holding the corresponding heating member, which is not bent.

25. The machine according to claim 23, wherein the station for coupling the heating member to the semi-finished disposable cartridge comprises a welding device (47), which carries out a welding of the heating member to the electrodes and is arranged downstream of the station for supplying the semi-finished disposable cartridges.

26. The machine according to claim 25, wherein the station for bending the heating member in a "U" shape comprises at least one movable bending device (48*) which, by intercepting the heating member, bends it in a "U" shape around the support body (6).

\* \* \* \* \*